United States Patent [19]

Brock

[11] Patent Number: 5,039,712

[45] Date of Patent: Aug. 13, 1991

[54] OPEN-CELLED FLEXIBLE POLYURETHANE FOAMS AND A PROCESS FOR THEIR PRODUCTION

[75] Inventor: Martin Brock, Cologne, Fed. Rep. of Germany

[73] Assignee: Bayer Aktiengesellschaft, Bayerwerk, Fed. Rep. of Germany

[21] Appl. No.: 661,588

[22] Filed: Feb. 26, 1991

[30] Foreign Application Priority Data

Feb. 28, 1990 [DE] Fed. Rep. of Germany ....... 4006247

[51] Int. Cl.$^5$ .............................................. C08J 9/08
[52] U.S. Cl. ...................... 521/126; 521/97; 521/130
[58] Field of Search ......................... 521/97, 126, 130

[56] References Cited

U.S. PATENT DOCUMENTS

| | | | |
|---|---|---|---|
| 4,070,310 | 1/1978 | Schneider et al. | 260/2.5 BD |
| 4,297,442 | 10/1981 | Blahak | 521/107 |
| 4,983,320 | 1/1991 | Franklin et al. | 521/97 |

*Primary Examiner*—p Morton Foelak
*Attorney, Agent, or Firm*—Joseph C. Gil; Lyndanne M. Whalen

[57] ABSTRACT

Open-celled, elastic, flexible polyurethane foams are made without using a chlorofluorocarbon blowing agent. A polyisocyanate is reacted with a polyether in the presence of water and from about 0.1 to abour 10% by weight (based on polyether) of an organic blowing agent selected from dicarbonic acid alkyl esters, dicarbonic acid cycloalkyl esters, dicarbonic acid benzyl esters and combinations thereof. Optional starting materials include catalysts, chain lengthening agents, emulsifiers and other commonly used additives.

14 Claims, No Drawings

OPEN-CELLED FLEXIBLE POLYURETHANE FOAMS AND A PROCESS FOR THEIR PRODUCTION

BACKGROUND OF THE INVENTION

This invention relates to open-celled, flexible polyurethane foams and to a process for their production.

Open-celled polyurethane foams and their use in the production of plastics are described in German Offenlegungsschriften 29 28 357 and 25 24 834. However, the plastics produced from these disclosed foams are totally different from plastics produced from flexible polyurethane foams. High-density and elastomeric plastics are obtained from open-celled polyurethane foams. The use of compounds such as those employed in the practice of the present invention to produce open-celled flexible foams and the advantages achieved are not taught or suggested by the prior art.

An important feature of the present invention is the use of dicarbonic acid alkyl, cycloalkyl or benzyl esters in combination with water. This feature of the invention eliminates the need to use fluorinated and chlorinated hydrocarbons (CFC's), which are regarded as ecologically harmful, in the production of, for example molded foams.

Until now, CFC's have been used for two reasons: (1) They act as an additional physical blowing agent and thereby promote reduction of the density of foams which in turn reduces raw material costs for the processor; and (2) they do not form any hardness-increasing urea segments (from the isocyanate/water reaction) in the foaming process so the hardness of foams is reduced. The simple production of flexible foams has therefore been believed to be possible only when CFC's are used.

Both of the above-enumerated factors must be given adequate consideration in the search for new substitutes for CFC's. These factors have not however been sufficiently addressed in the CFC-free processes which have been proposed in the past.

For example, it is known that foam density can be reduced by increasing the quantity of water used in a raw material formulation. The quality of the foams produced with such larger amounts of water is however significantly reduced. Known measures which have successfully reduced foam hardness have not however been able to reduce density.

It would therefore be advantageous to have a process for producing high quality, elastic, low density foams in which no CFC was employed.

SUMMARY OF THE INVENTION

It is an object of the present invention to provide high quality, elastic, open-celled, low density polyurethane foams which have been produced without the use of chlorofluorocarbons.

It is another object of the present invention to provide a process for producing high quality, open-celled, elastic, low density polyurethane foams in which no chlorofluorocarbon is included in the foam forming mixture.

These and other objects which will be apparent to those skilled in the art are accomplished by reacting a polyisocyanate with a polyether in the presence of water and another blowing agent selected from dicarbonic acid alkyl esters, dicarbonic acid cycloalkyl esters, dicarbonic acid benzyl esters and mixtures thereof. A catalyst and chain extending agent are also frequently included in the reaction mixture.

DETAILED DESCRIPTION OF THE PREFERRED EMBODIMENTS OF THE INVENTION

It has now been found that the use of dicarbonic acid alkyl, cycloalkyl or benzyl esters makes it possible to produce high quality foams without the use of CFC's. Dicarbonic acid esters react with water to form $CO_2$ and monofunctional hydroxy compounds, generally alcohols. The $CO_2$ formed acts as a blowing agent and reduces density. The reactive alcohols react with isocyanate groups to form urethane structures. Since the are monohydric, the crosslink density of the polymer matrix and the hardness of the foams are reduced. The Examples given infra illustrate these effects very clearly.

Another advantage of dicarbonic acid esters is that they increase safety of production. In the production of hot-cured molded foams for example, the quality of the products is controlled through separately added tin catalysts. Too little tin catalyst leads to uncrosslinked foams while too much catalyst increases the number of unwanted closed cells. In the presence of dicarbonic acid esters, the degree of flexibility in the quantity of catalyst used is distinctly increased. This in turn results in increased safety of production.

Accordingly, the present invention relates to a process for the production of open-celled, flexible polyurethane foams by reaction of a) a polyisocyanate with b) a polyether containing at least two isocyanate-reactive hydrogen atoms and having a molecular weight in the range from 400 to 10,000 in the presence of c) water and d) a dicarbonic acid alkyl, cycloalkyl or benzyl ester, preferably ethyl or methyl dicarbonic acid ester. The dicarbonic acid ester is used as an additional blowing agent in a quantity of from about 0.1 to 10% by weight (based on b) and preferably in a quantity of from 0.1 to 5% by weight. Materials which may optionally be included in the reaction mixture include: d) a catalyst; e) a compound containing at least two isocyanate-reactive hydrogen atoms and having a molecular weight of 32 to 399 and f) any of the known surface-active or flameproofing additives and other auxiliaries. The dicarbonic acid ester blowing agent may be added to the isocyanate component, to the polyol component or as an independent component. The products of this process are particularly useful in the production of hot-curing flexible molded foams. Divalent or tetravalent organometallic compounds, preferably tin (II) salts of higher carboxylic acids, are often used as catalysts.

The polyisocyanates useful in carrying out the process of the present invention include: any of the known aliphatic, cycloaliphatic, araliphatic, aromatic and heterocyclic polyisocyanates. Examples of these known isocyanates are given, for example by W. Siefken in Justus Liebigs Annalen der Chemie, 362, pages 75 to 136. Suitable polyisocyanates include those corresponding to the formula

in which n represents a number of from about 2 to about 5, preferably 2-3 and

Q represents an aliphatic hydrocarbon radical containing from about 2 to about 18 carbon atoms and preferably from about 6 to about 10 carbon atoms; a cycloaliphatic hydrocarbon radical containing from about 4 to about 15 carbon atoms and preferably from about 5 to about 10 carbon atoms; an aromatic hydrocarbon radical containing from about 6 to about 15 carbon atoms and preferably from about 6 to about 13 carbon atoms.

Specific examples of polyisocyanates within the scope of this formula are given in, for example, German Offenlegungsschrift 28 32 253 at pages 10–11.

In general, polyisocyanates readily obtainable on an industrial scale, for example, 2,4- and 2,6-tolylene diisocyanate, and mixtures of these isomers ("TDI") are preferred. Monomeric and polymeric diphenyl methane diisocyanates and mixtures thereof with TDI may also be used.

The polyethers useful as starting materials in the process of the present invention contain at least two active hydrogen atoms, preferably hydroxyl groups. The preferred polyethers are based on propylene oxide or propylene oxide/ethylene oxide mixtures. The polyethers generally have a molecular weight of from about 400 to about 10,000. These polyethers may, of course, contain alkylene oxide other than propylene oxide and ethylene oxide groups. The high molecular weight polyethers useful in the process of the present invention are known. Specific examples of such polyethers are described in Kunararoffhandbuch Vol VII, edited by Viewweg Höchtlen, Carl Hanser Verlag, München 1966.

The blowing agents employed in the process of the present invention are (1) water and (2) a dicarbonic acid dialkyl, cycloalkyl or benzyl ester (pyrocarbonic acid dialkyl ester) corresponding to the formula

RO—CO—O—CO—OR' in which
R and R' which may be the same or different each represents a $C_{1-6}$ alkyl group, preferably a methyl or ethyl group, a $C_{5-7}$ cycloalkyl group, preferably a cyclohexyl group, or a benzyl group.

One of the optional starting materials useful in the process of the present invention is a chain extending or crosslinking agent. These compounds generally contain at least two isocyanate-reactive hydrogen atoms and have a molecular weight in the range from 32 to 399. These compounds may contain hydroxyl groups, amino groups, thiol groups, carboxyl groups and combinations thereof. The preferred compounds contain hydroxyl groups and/or amino groups. These compounds preferably contain from 2 to 8 and most preferably from 2 to 4 isocyanate-reactive hydrogen atoms. Examples of such compounds can be found in German Offenlegungsschrift 2,832,253 at pages 19–20.

Other auxiliary agents and additives which may optionally be used in the process of the present invention include: surface-active additives, such as emulsifiers and foam stabilizers; known catalysts, preferably organic Sn(II) and/or Sn(IV) compounds, most preferably Sn(II) salts of higher carboxylic acids; reaction retarders, known cell regulators such as paraffins or fatty alcohols or dimethyl polysiloxanes; known pigments or dyes and flameproofing agents, for example trischloroethyl phosphate and tricresyl phosphate; stabilizers against ageing and weathering; plasticizers; fungistatic and bacteriostatic agents and also fillers, such as barium sulfate, kieselguhr, carbon black and whiting.

Specific examples of surface-active additives and foam stabilizers, cell regulators, reaction retarders, stabilizers, flameproofing agents, plasticizers, dyes, fillers, fungistatic and bacteriostatic agents which may optionally be used in accordance with the present invention and information on the use of these additives and the way in which they work can be found in Kunststoff-Handbuch, Vol. VII, edited by Vieweg and Hochtlen, Carl-Hanser-Verlag, Munchen 1966, for example on pages 103 to 113.

In the process of the present invention, the starting materials may be reacted by the known single-stage process, the prepolymer process or the semiprepolymer process. Suitable equipment for the conduct of this reaction is described, for example, in U.S. Pat. No. 2,764,565. The reaction may advantageously be carried out in closed molds. Particulars of other processing machines which may also be used in accordance with the present invention can be found in Kunststoff-Handbuch, Vol. VII, edited by Vieweg and Hochtlen, Carl-Hanser-Verlag, Munchen 1966, for example on pages 121 to 205.

The flexible molded foams obtainable in accordance with the invention may be used, for example, as a cushion material for seats, arm rests and head rests.

Having thus described our invention, the following Examples are given as being illustrative thereof. All parts and percentages given in these Examples are parts by weight and percentages by weight, unless otherwise indicated.

EXAMPLES

The materials used in the Examples summarized in Table 1 were as follows:
Polyether: a glycerol-started, trifunctional, long-chained propylene oxide/ethylene oxide polyether (approx. 10% ethylene oxide, OH value 50, molecular weight approx. 3,900)
Foam stabilizer: OS 32 (a product of Bayer AG) polyether siloxane
Catalyst 1: bis-N,N'-dimethylaminodiethyl ether, 70% in dipropylene glycol
Catalyst 2: tin(II) octoate
Additive: dicarbonic acid diethyl ester (blowing agent)
T 80: tolylene diisocyanate, a mixture of 2,4-and 2,6-isomers in a ratio by weight of 80:20%.

All of the components were intensively mixed and foamed in a closed mold (22×22×7 cm). Particulars of the formulations used and physical data of the flexible molded foams obtained are given in Table 1.

TABLE 1

| Example | 1 (Comp.) | 2 | 3 | 4 | 5 | 6 | 7 | 8 (Comp.) | 9 (Comp.) | 10 (Comp.) |
|---|---|---|---|---|---|---|---|---|---|---|
| Polyether* | 100 | 100 | 100 | 100 | 100 | 100 | 100 | 100 | 100 | 100 |
| Water* | 3.5 | 3.5 | 3.5 | 3.5 | 3.5 | 3.5 | 3.5 | 3.5 | 3.5 | 3.5 |
| Stabilizer* | 1.0 | 1.0 | 1.0 | 1.0 | 1.0 | 1.0 | 1.0 | 1.0 | 1.0 | 1.0 |
| Catalyst 1* | 0.15 | 0.15 | 0.15 | 0.15 | 0.15 | 0.15 | 0.15 | 0.15 | 0.15 | 0.15 |
| Catalyst 2* | 0.1 | 0.1 | 0.1 | 0.1 | 0.08 | 0.1 | 0.12 | 0.07 | 0.1 | 0.12 |
| Additive* | — | 1 | 2 | 3 | 2 | 2 | 2 | — | — | — |

TABLE 1-continued

| Example | 1 (Comp.) | 2 | 3 | 4 | 5 | 6 | 7 | 8 (Comp.) | 9 (Comp.) | 10 (Comp.) |
|---|---|---|---|---|---|---|---|---|---|---|
| T 80** | 100 | 100 | 100 | 100 | 100 | 100 | 100 | 100 | 100 | 100 |
| Density | 32 | 30 | 28 | 26 | | | | | | |
| Compression hardness (kPa) 40% compression | 3.4 | 3.0 | 2.6 | 1.8 | | | | | | |
| Closed-cell character*** | | | | | open | open | open | open under cross-linked | open | closed |

*Parts by weight
**Quantity according to index
***Closed-cell character is an evaluation based on the degree of air permeability (1/cm$^2$). High values mean open-cell foams, low values closed-cell foams Although the invention has been described in detail in the foregoing for the purpose of illustration, it is to be understood that such detail is solely for that purpose and that variations can be made therein by those skilled in the art without departing from the spirit and scope of the invention except as it may be limited by claims.

What is claimed is:

1. A process for the production of elastic, open-celled, flexible polyurethane foams comprising reacting
   a) a polyisocyanate
   with
   b) a polyether containing at least two isocyanate-reactive hydrogen atoms and having a molecular weight of from about 400 to about 10,000
   in the presence of
   c) a catalyst which is selected from the group consisting of divalent organometallic compounds, tetravalent organometallic compounds and combinations thereof,
   d) water and
   e) from about 0.1 to about 10% by weight, based on b) of an organic blowing agent selected from the group consisting of dicarbonic acid alkyl esters, dicarbonic acid cycloalkyl esters, dicarbonic acid benzyl esters and mixtures thereof.

2. The process of claim 1 in which the organic blowing agent e) is dicarbonic acid ethyl ester.

3. The process of claim 1 in which the catalyst c) is a divalent tin salt of a carboxylic acid.

4. The process of claim 3 in which a chain lengthening agent is included in the reaction mixture.

5. The process of claim 1 in which the organic blowing agent e) is dicarbonic acid methyl ester.

6. The process of claim 5 in which the catalyst c) is a divalent tin salt of a carboxylic acid.

7. The process of claim 6 in which a chain lengthening agent is included in the reaction mixture.

8. The process of claim 1 in which the catalyst c) is a divalent tin salt of a carboxylic acid.

9. The process of claim 1 in which the polyisocyanate a) is tolylene diisocyanate.

10. The process of claim 1 in which a chain lengthening agent is included in the reaction mixture.

11. The elastic, open-celled, flexible polyurethane foam produced by the process of claim 1.

12. The elastic, open-celled, flexible polyurethane foam produced by the process of claim 3.

13. The elastic, open-celled, flexible polyurethane foam produced by the process of claim 6.

14. A process for producing a molded article comprising molding the foam produced by the process of claim 1 and hot curing this molded foam.

* * * * *